US010011668B2

(12) United States Patent
Mignogna et al.

(10) Patent No.: US 10,011,668 B2
(45) Date of Patent: Jul. 3, 2018

(54) CATALYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Igor Kashulin, Moscow (RU); Giampiero Morini, Ferrara (IT); Ilya Nifant'ev, Moscow (RU)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 15/560,317

(22) PCT Filed: Mar. 31, 2016

(86) PCT No.: PCT/EP2016/057031
§ 371 (c)(1),
(2) Date: Sep. 21, 2017

(87) PCT Pub. No.: WO2016/156473
PCT Pub. Date: Oct. 6, 2016

(65) Prior Publication Data

US 2018/0057622 A1 Mar. 1, 2018

(30) Foreign Application Priority Data

Apr. 1, 2015 (EP) .................................... 15162220

(51) Int. Cl.

| | |
|---|---|
| ***C08F 4/649*** | (2006.01) |
| ***C08F 4/651*** | (2006.01) |
| ***C08F 4/654*** | (2006.01) |
| ***C08F 4/655*** | (2006.01) |
| ***C08F 110/06*** | (2006.01) |
| *C08F 4/645* | (2006.01) |

(52) U.S. Cl.
CPC ............ *C08F 110/06* (2013.01); *C08F 4/649* (2013.01); *C08F 4/6495* (2013.01); *C08F 4/6498* (2013.01); *C08F 4/6455* (2013.01); *C08F 4/6457* (2013.01); *C08F 4/654* (2013.01); *C08F 4/655* (2013.01); *C08F 2410/01* (2013.01)

(58) Field of Classification Search
CPC .... C08F 4/6421; C08F 4/6494; C08F 4/6496; C08F 4/654; C08F 4/656; C08F 4/649; C08F 4/6498; C08F 4/6495; C08F 4/6455; C08F 4/6457; C08F 2410/01; C08F 10/06
See application file for complete search history.

(56) References Cited

U.S. PATENT DOCUMENTS

| | | | |
|---|---|---|---|
| 4,211,670 | A | 7/1980 | Vandenberg |
| 2005/0239636 | A1 | 10/2005 | Gao et al. |

FOREIGN PATENT DOCUMENTS

| | | | |
|---|---|---|---|
| EP | 2803679 A1 | 11/2014 | |
| RU | 2298014 C2 | 4/2007 | |
| WO | WO-2006096621 A2 | 9/2006 | |
| WO | 2011106494 A1 | 9/2011 | |
| WO | 2014160012 A2 | 10/2014 | |
| WO | 2014184289 A1 | 11/2014 | |

OTHER PUBLICATIONS

International Search Report and Written Opinion dated Aug. 16, 2016 (Aug. 16, 2016) for Corresponding PCT/EP2016/057031.

*Primary Examiner* — Caixia Lu

(57) ABSTRACT

The present disclosure relates to a catalyst component for the polymerization of olefins comprising Mg. Ti and an electron donor such as mercaptoester derivatives of the general formula (I).

(I)

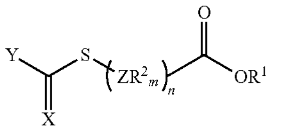

in which Z is selected from C, Si, O, N, S or P, with the proviso that the atoms O, S, P and N are not directly linked to either the carboxylic group or the sulfur atom of formula (I), the $R^2$ groups, equal to or different from each other, are selected from hydrogen or a $C_1$-$C_{20}$ hydrocarbon radicals, optionally containing a heteroatom selected from halogen, P, S, N, O and Si, which can be fused together to form one or more cycles, m is a number satisfying the valences of Z and n is an integer ranging from 1 to 10, X is O or S, Y is —$OR^3$, —$NR^4R^5$) or $R^6$ groups in which $R^1$ and $R^3$ are selected from $C_1$-$C_{15}$ hydrocarbon groups, optionally containing a heteroatom selected from halogen, P, S, N, O, and Si, $R^4$-$R^5$ groups, independently, are hydrogen or $R^1$ groups, and $R^6$ groups have the same composition as $R^1$ groups.

15 Claims, No Drawings

CATALYST COMPONENTS FOR THE POLYMERIZATION OF OLEFINS

This application is the U.S. National Phase of PCT International Application PCT/EP2016/057031, filed Mar. 31, 2016, claiming benefit of priority to European Patent Application No. 15162220.6, filed Apr. 1, 2015, the contents of which are incorporated herein by reference in its entirety.

FIELD OF THE INVENTION

The present disclosure relates to the field of chemistry including catalyst components for the polymerization of olefins, such as propylene, comprising a magnesium (Mg) dihalide based support on which are supported Ti atoms and an electron donor selected from a specific class of mercaptoesters derivatives. The present disclosure further relates to catalysts obtained from these components and to their use in processes for the polymerization of olefins such as propylene.

BACKGROUND OF THE INVENTION

Catalyst components for the stereospecific polymerization of olefins have been disclosed in the art. Ziegler-Natta catalysts may be used for such polymerizations and can comprise a solid catalyst component a magnesium dihalide, a titanium compound an internal electron donor compound and/or an alkyl aluminum (Al-alkyl) compound. However, when a higher polymer crystallinity of the polymer is desired, an external donor (for example, an alkoxysilane) may be needed in order to obtain higher isotacticity. Esters of phthalic acid, such as diisobutylphthalate, may be used as internal electron donors in catalyst preparations. The phthalates may further be used as internal electron donors in combination with alkylalkoxysilanes as external electron donors. This catalyst system may give good performances in terms of activity, isotacticity and xylene insolubility (XI).

However, one of the problems associated with the use of this catalyst system is that phthalates have recently raised concerns regarding potential health and medical issues associated with their use.

Consequently, research activities have been devoted to discovering alternative classes of internal electron donors for use in the preparation of catalyst components for propylene polymerization.

One of the classes investigated is acyloxyesters as described, for example in U.S. Pat. No. 7,351,778. These compounds may be obtained by the esterification of hydroxyl ester derivatives. Surprisingly, the applicant has found that a particular class of donors based on mercapto derivatives can generate a wide arrange of molecules with equal or different functional groups which, when used as internal electron donors, can generate catalysts showing a good balance of activity and stereospecificity.

SUMMARY OF THE INVENTION

The present disclosure relates to a catalyst component for the polymerization of olefins comprising Mg, Ti and an electron donor compound of the general formula (I):

(I)

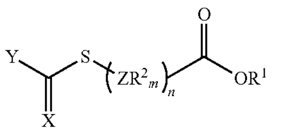

in which Z is selected from C, Si, O, N, S or P, with the proviso that the atoms O, S, P and N are not directly linked to either the carboxylic group or the sulfur atom of formula (I); the $R^2$ groups, equal to or different from each other, are selected from hydrogen or $C_1$-$C_{20}$ hydrocarbon radicals, optionally containing a heteroatom selected from halogen, P, S, N, O and Si, which can be fused together to form one or more cycles; m is a number satisfying the valences of Z; n is an integer ranging from 1 to 10; X is O or S; and Y is selected from —$OR^3$, —$NR^4R^5$ or $R^6$ groups in which $R^1$ and $R^3$ are selected from $C_1$-$C_{15}$ hydrocarbon groups, optionally containing a heteroatom selected from halogen, P, S, N, O, and Si, $R^4$-$R^5$ groups, independently, are hydrogen or $R^1$ groups and $R^6$ groups have the same meaning as $R^1$ groups.

DETAILED DESCRIPTION OF THE INVENTION

In some embodiments, Z is selected from carbon (C) and silicon (Si).

In a further embodiment, the $(ZR^2{}_m)_n$ group of formula (I) can be selected from the group consisting of aliphatic, alicyclic and aromatic bivalent radicals, optionally substituted with $C_1$-$C_{15}$ hydrocarbon groups and/or with heteroatoms selected from halogen, P, S, N, O and Si, and having a bridging chain length ranging from 1 to 6 atoms, such as from 1 to 4 atoms.

In one embodiment, the bridging group is an aliphatic or alicyclic bridging group having a bridging chain length of 1-6 carbon atoms. Among this class, bridging groups may include those of the formula —$(CR^7{}_p)_s$—, in which $R^7$ is independently hydrogen or a $C_1$-$C_{20}$ hydrocarbon radical, optionally substituted with heteroatoms selected from halogen, P, S, N, O and Si, which can be fused together to form one or more cycles, p is a number satisfying the available valence of carbon, and s is a number from 1 to 6, such as from 1 to 4.

In certain embodiments, structures in which the bridging group is an aliphatic or alicyclic bridging group are those of the formula (II):

(II)

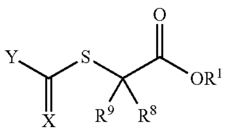

in which X, Y and $R^1$ have the same meaning previously described, and $R^8$-$R^9$ groups are independently selected from hydrogen or $C_1$-$C_{20}$ hydrocarbon radicals, optionally substituted with heteroatoms selected from halogen, P, S, N, O and Si, which can be fused together to form one or more cycles. In connection with the structures of formula (II), X is O or S, Y is an $OR^3$ group, and at least one of $R^8$-$R^9$ groups is different from hydrogen, such as a $C_1$-$C_{10}$ alkyl group.

In additional embodiments, another group of structures in which the bridging group is an aliphatic or alicyclic bridging group are those of the formula (III):

(III)

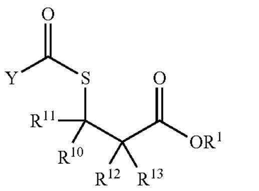

in which Y and $R^1$ have the same meaning previously described, $R^{10}$-$R^{13}$ groups are independently selected from hydrogen or a $C_1$-$C_{20}$ hydrocarbon radical, optionally substituted with heteroatoms selected from halogen, P, S, N, O and Si, which can be fused together to form one or more cycles.

In some embodiments, Y is a —$OR^3$ group as previously defined. In additional embodiments, $R^3$ is a $C_1$-$C_{10}$ alkyl group such as a $C_1$-$C_5$ linear alkyl, including in certain embodiments an ethyl group.

In further embodiments, Y is $NR^4R^5$, the $R^{10}$-$R^{13}$ groups are independently hydrogen or a $C_1$-$C_5$ alkyl radicals, and $R^1$ is a $C_1$-$C_5$ linear alkyl group such as an ethyl group.

In some embodiments, when Y is $R^6$ it comprises phenyl ring(s). In additional embodiments, the phenyl ring is mono-substituted with a hydrocarbon group or a halogen, including $C_1$-$C_{10}$ alkyl groups, $C_6$-$C_{14}$ aryl groups, $C_3$-$C_{15}$ cycloalkyl groups, and $C_7$-$C_{15}$ arylalkyl or alkylaryl groups, and linear $C_1$-$C_5$ alkyl groups. In further embodiments, the hydrocarbon substituent(s) is/are located in the 4-position of the phenyl ring.

Halogens for use as substituents in the phenyl ring(s) include Cl, Br and F. In some embodiments, the halogens may be positioned in the meta and/or para positions. In certain embodiments, other positions in addition to the meta and/or para may be substituted with halogens and/or hydrocarbon groups, including the ortho position.

In additional embodiments, structures of the formula (III) may include those in which at least one of $R^{10}$-$R^{11}$ groups is selected from $C_1$-$C_{20}$ hydrocarbon radicals, including $C_1$-$C_{10}$ alkyls such as $C_3$-$C_{10}$ linear alkyls.

Another class of bridging groups for use in the present disclosure includes aryl or alkylaryl groups through which the carbon atom(s) can act as a bridge. Among them, phenyl groups optionally substituted with halogens or $C_1$-$C_{20}$ alkyl radicals are used in some embodiments.

In some embodiments, structures of the formula (IV):

(IV)

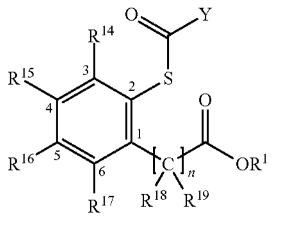

where Y and $R^1$ have the meaning previously defined; $R^{18}$ to $R^{19}$ groups, equal to or different from each other, are hydrogen or $C_1$-$C_{15}$ hydrocarbon groups and optionally comprise a heteroatom selected from halogen, P, S, N, O, and Si which can be fused together to form one or more cycles; n is an integer from 0 to 2; and $R^{14}$-$R^{17}$, independently, are selected from hydrogen, halogens or $C_1$-$C_{15}$ hydrocarbon groups optionally substituted with heteroatoms selected from halogen, P, S, N, O and Si.

In certain embodiments, Y is a —$OR^3$ group in which $R^3$ is a $C_1$-$C_{10}$ alkyl group, including a $C_1$-$C_5$ linear alkyl group such as an ethyl group.

In one embodiment n is 0, $R^1$ is a $C_1$-$C_{10}$ alkyl group, and $R^{14}$-$R^{17}$ are hydrogens.

Non-limiting examples of the structures of formulas (I) and (II) are the following: butyl 2-(benzoylthio)propanoate, ethyl 2-((3-chlorobenzoyl)thio)-2-methylpropanoate, ethyl 2-((3-chlorobenzoyl)thio)acetate, ethyl 2-((3-chlorobenzoyl)thio)propanoate, ethyl 2-((4-butylbenzoyl)thio)-2-methylpropanoate, ethyl 2-((4-butylbenzoyl)thio)acetate, ethyl 2-((4-butylbenzoyl)thio)propanoate, ethyl 2-((4-chlorobenzoyl)thio)-2-methylpropanoate, ethyl 2-((4-chlorobenzoyl)thio)-3,3-dimethylbutanoate, ethyl 2-((4-chlorobenzoyl)thio)-3-methylbutanoate, ethyl 2-((4-chlorobenzoyl)thio)acetate, ethyl 2-((4-chlorobenzoyl)thio)propanoate, ethyl 2-((4-chlorophenylcarbonothioyl)thio)-2-methylpropanoate, ethyl 2-((4-ethylbenzoyl)thio)-2-methylpropanoate, ethyl 2-((4-ethylbenzoyl)thio)acetate, ethyl 2-((4-ethylbenzoyl)thio)propanoate, ethyl 2-((4-methylbenzoyl)thio)acetate, ethyl 2-((4-methylbenzoyl)thio)propanoate, ethyl 2-((4-propylbenzoyl)thio)acetate, ethyl 2-((4-propylbenzoyl)thio)propanoate, ethyl 2-((phenylcarbonothioyl)thio)propanoate, ethyl 2-(benzoylthio)-2-methylpropanoate, ethyl 2-(benzoylthio)-3-methylbutanoate, ethyl 2-(benzoylthio)-3-phenylpropanoate, ethyl 2-(benzoylthio)acetate, ethyl 2-(benzoylthio)propanoate, ethyl 2-methyl-2-((4-methylbenzoyl)thio)propanoate, ethyl 2-methyl-2-((4-propylbenzoyl)thio)propanoate, ethyl 2-methyl-2-((4-propylphenylcarbonothioyl)thio)propanoate, ethyl 3-methyl-2-((4-propylbenzoyl)thio)butanoate, ethyl 4-methyl-2-((4-propylbenzoyl)thio)pentanoate, propyl 2-((1-naphthoyl)thio)propanoate, propyl 2-((2-naphthoyl)thio)propanoate, propyl 2-(benzoylthio)propanoate, butyl 2-((diethylcarbamoyl)thio)-3-methylbutanoate, ethyl 2-((diethylcarbamothioyl)thio)propanoate, ethyl 2-((diethylcarbamoyl)thio)-2-ethylbutanoate, ethyl 2-((diethylcarbamoyl)thio)-2-isobutyl-4-methylpentanoate, ethyl 2-((diethylcarbamoyl)thio)-2-methylpropanoate, ethyl 2-((diethylcarbamoyl)thio)acetate, ethyl 2-((diethylcarbamoyl)thio)propanoate, ethyl 2-((dimethylcarbamothioyl)thio)-2-methylpropanoate, ethyl 2-((dimethylcarbamoyl)thio)-2-methylpropanoate, ethyl 2-((dimethylcarbamoyl)thio)acetate, ethyl 2-((dimethylcarbamoyl)thio)propanoate, ethyl 2-((dipropylcarbamothioyl)thio)-2-methylpropanoate, ethyl 2-((piperidine-1-carbonyl)thio)propanoate, ethyl 2-(carbamoylthio)-2-methylpropanoate, ethyl 2-(carbamoylthio)acetate, ethyl 2-(carbamoylthio)propanoate, ethyl 2-methyl-2-((pyrrolidine-1-carbonyl)thio)propanoate, isobutyl 2-((diethylcarbamothioyl)thio)-3,3-dimethylbutanoate, isobutyl 2-((diethylcarbamoyl)thio)-3-methylbutanoate, butyl 2-((ethoxycarbonyl)thio)-3-methylbutanoate, ethyl 2-((butoxycarbonyl)thio)propanoate, ethyl 2-((ethoxycarbonothioyl)thio)propanoate, ethyl 2-((ethoxycarbonyl)thio)-2-ethylbutanoate, ethyl 2-((ethoxycarbonyl)thio)-2-isobutyl-4-methylpentanoate, ethyl 2-((ethoxycarbonyl)thio)-2-methylpropanoate, ethyl 2-((ethoxycarbonyl)thio)acetate, ethyl 2-((ethoxycarbonyl)thio)propanoate, ethyl 2-((methoxycarbonothioyl)thio)-2-methylpropanoate, ethyl 2-((methoxycarbonyl)thio)-2-methylpropanoate, ethyl 2-((methoxycarbonyl)thio)acetate, ethyl 2-((methoxycarbonyl)thio)propanoate, ethyl 2-((phenoxycarbonyl)thio)acetate, ethyl 2-((phenoxycarbonyl)thio)propanoate, ethyl 2-methyl-2-((phenoxycarbonyl)thio)propanoate, ethyl 2-methyl-2-((propoxycarbonothioyl)thio)propanoate, ethyl 2-methyl-2-((propoxycarbonyl)thio)propanoate, isobutyl 2-((ethoxycarbonothioyl)thio)-3,3-dimethylbutanoate, isobutyl 2-((ethoxycarbonyl)thio)-3-methylbutanoate, ethyl 2-((2,2-dimethylpropanethioyl)thio)-3-methylbutanoate, ethyl 2-(acetylthio)-2-methylpropanoate, ethyl 2-(acetylthio)acetate, ethyl 2-(acetylthio)propanoate, ethyl 2-(acryloylthio)-4-methylpentanoate, ethyl 2-(ethanethioylthio)-2-methylpropanoate, ethyl 2-(ethanethioylthio)acetate, ethyl 2-(ethanethioylthio)propanoate, ethyl 2-(isobutyrylthio)-2-methylpropanoate, ethyl 2-(isobutyrylthio)-3-methylbutanoate, ethyl 2-(isobutyrylthio)acetate, ethyl 2-(isobutyrylthio)propanoate, ethyl 2-(pentanoylthio)acetate, ethyl 2-(propionylthio)propanoate, ethyl 2-methyl-2-((2-phenylacetyl)thio)propanoate, ethyl 2-methyl-2-((2-phenyl ethanethioyl)thio)propanoate, ethyl 3-methyl-2-((2-methylpropanethioyl)thio)butanoate, ethyl 3-methyl-2-(pivaloylthio)butanoate, ethyl 3-methyl-2-(propanethioylthio)butanoate, ethyl 3-methyl-2-(propionylthio)butanoate, isopentyl 2-(acetylthio)acetate, butyl 3-((3-chlorobenzoyl)thio)propanoate, butyl 3-((4-propylbenzoyl)thio)propanoate, butyl 3-(benzoylthio)-2-methylpropanoate, butyl 3-(benzoylthio)propanoate, ethyl 2,2-dimethyl-3-((4-methylbenzoyl)thio)propanoate, ethyl 2,2-dimethyl-3-((4-propylbenzoyl)thio)propanoate, ethyl 2-(benzoylthio)cyclohexanecarboxylate, ethyl 2-isobutyl-3-(pivaloylthio)-2-propylheptanoate, ethyl 2-methyl-3-((4-methylbenzoyl)thio)butanoate, ethyl 2-methyl-3-((4-methylbenzoyl)thio)propanoate, ethyl 2-methyl-3-((4-propylbenzoyl)thio)butanoate, ethyl 2-methyl-3-((4-propylbenzoyl)thio)propanoate, ethyl 3-((3-chlorobenzoyl)thio)-2,2-dimethylpropanoate, ethyl 3-((3-chlorobenzoyl)thio)-2-isobutyl-2-propylheptanoate, ethyl 3-((3-chlorobenzoyl)thio)-2-methylbutanoate, ethyl 3-((3-chlorobenzoyl)thio)-2-methylpropanoate, ethyl 3-((3-chlorobenzoyl)thio)butanoate, ethyl 3-((3-chlorobenzoyl)thio)propanoate, ethyl 3-((4-chlorobenzoyl)thio)-2,2-dimethylpropanoate, ethyl 3-((4-chlorobenzoyl)thio)-2-methylbutanoate, ethyl 3-((4-chlorobenzoyl)thio)-2-methylpropanoate, ethyl 3-((4-chlorobenzoyl)thio)butanoate, ethyl 3-((4-chlorobenzoyl)thio)propanoate, ethyl 3-((4-methylbenzoyl)thio)butanoate, ethyl 3-((4-methylbenzoyl)thio)propanoate, ethyl 3-((4-propylbenzoyl)thio)butanoate, ethyl 3-((4-propylbenzoyl)thio)propanoate, ethyl 3-((4-propyl phenyl carbonothioyl)thio)propanoate, ethyl 3-((phenyl carbonothioyl)thio)propanoate, ethyl 3-(acetylthio)propanoate, ethyl 3-(benzoylthio)-2,2-dimethylpropanoate, ethyl 3-(benzoylthio)-2-isobutyl-2-propylheptanoate, ethyl 3-(benzoylthio)-2-methylbutanoate, ethyl 3-(benzoylthio)-2-methylpropanoate, ethyl 3-(benzoylthio)butanoate, ethyl 3-(benzoylthio)propanoate, ethyl 3-(isobutyrylthio)butanoate, methyl 3-((3-chlorobenzoyl)thio)propanoate, butyl 3-((diethylcarbamoyl)thio)propanoate, butyl 3-((ethoxycarbonyl)thio)propanoate, ethyl 2-methyl-3-((phenoxycarbonyl)thio)propanoate, ethyl 2-methyl-3-((propoxycarbonyl)thio)butanoate, ethyl 3-((diethylcarbamothioyl)thio)-2-isobutyl-2-propylheptanoate, ethyl 3-((diethylcarbamoyl)thio)-2-isobutyl-2-propylheptanoate, ethyl 3-((diethylcarbamoyl)thio)-2-methylbutanoate, ethyl 3-((diethylcarbamoyl)thio)-2-methylpropanoate, ethyl 3-((diethylcarbamoyl)thio)propanoate, ethyl 3-((diisobutylcarbamoyl)thio)-2-methylpropanoate, ethyl 3-((dimethylcarbamoyl)thio)-2-methylbutanoate, ethyl 3-((dimethylcarbamoyl)thio)-2-methylpropanoate, ethyl 3-((diphenylcarbamoyl)thio)-2-methylpropanoate, ethyl 3-((ethoxycarbonyl)thio)-2-isobutyl-2-propylheptanoate, ethyl 3-((ethoxycarbonyl)thio)-2-methylbutanoate, ethyl 3-((ethoxycarbonyl)thio)-2-methylpropanoate, ethyl 3-((isobutoxycarbonyl)thio)-2-methylpropanoate, methyl 3-((diethylcarbamothioyl)thio)propanoate, methyl 3-((diethylcarbamoyl)thio)butanoate, methyl 3-((diethylcarbamoyl)thio)propanoate, methyl 3-((ethoxycarbonothioyl)thio)propanoate, methyl 3-((ethoxycarbonyl)thio)butanoate, methyl 3-((ethoxycarbonyl)thio)propanoate, S-(2-(3-oxopentyl)phenyl) benzothioate, ethyl 4-((diethylcarbamoyl)thio)butanoate, ethyl 4-((ethoxycarbonothioyl)thio)butanoate, ethyl 4-((ethoxycarbonyl)thio)butanoate, ethyl 4-(benzoylthio)butanoate, O-ethyl S-(2-(3-oxopentyl)phenyl) carbonodithioate, O-ethyl S-(2-(3-oxopentyl)phenyl) carbonothioate, S-(2-(3-oxopentyl)phenyl) diethylcarbamothioate, ethyl 2-(2-((3-chlorobenzoyl)thio)phenyl)acetate, ethyl 2-(2-((4-chlorobenzoyl)thio)phenyl)acetate, ethyl 2-(2-((4-propylbenzoyl)thio)phenyl)acetate, ethyl 2-(2-(acetylthio)-5-(tert-butyl)-3-methyl phenyl)acetate, ethyl 2-(2-(benzoylthio)-5-(tert-butyl)-3-methylphenyl)acetate, ethyl 2-(2-(benzoylthio)-5-(tert-butyl)phenyl)acetate, ethyl 2-(2-(benzoylthio)phenyl)-4-methylpentanoate, ethyl 2-(2-(benzoylthio)phenyl)acetate, ethyl 2-(5-(tert-butyl)-2-((2-methylpropanethioyl)thio)phenyl)acetate, ethyl 2-(5-(tert-butyl)-2-((3-chlorobenzoyl)thio)-3-methylphenyl)acetate, ethyl 2-(5-(tert-butyl)-2-((3-chlorobenzoyl)thio)phenyl)acetate, ethyl 2-(5-(tert-butyl)-2-((4-chlorobenzoyl)thio)-3-methylphenyl)acetate, ethyl 2-(5-(tert-butyl)-2-((4-chlorobenzoyl)thio)phenyl)acetate, ethyl 2-(5-(tert-butyl)-2-((4-propylbenzoyl)thio)phenyl)acetate, ethyl 2-(5-(tert-butyl)-2-((phenyl carbonothioyl)thio)phenyl)acetate, ethyl 2-(5-(tert-butyl)-2-(butyrylthio)-3-methylphenyl)acetate, ethyl 2-(5-(tert-butyl)-2-(isobutyrylthio)phenyl)acetate, ethyl 2-(5-(tert-butyl)-3-methyl-2-((4-propylbenzoyl)thio)phenyl)acetate, ethyl 2-(2-((diethylcarbamothioyl)thio)phenyl)acetate, ethyl 2-(2-((diethylcarbamoyl)thio)phenyl)acetate, ethyl 2-(2-((diethylcarbamoyl)thio)phenyl)propanoate, ethyl 2-(2-((dimethylcarbamoyl)thio)phenyl)acetate, ethyl 2-(2-((ethoxycarbonothioyl)thio)phenyl)acetate, ethyl 2-(2-((ethoxycarbonyl)thio)phenyl)acetate, ethyl 2-(2-((methoxycarbonyl)thio)phenyl)acetate, ethyl 2-(2-((phenoxycarbonothioyl)thio)phenyl)acetate, ethyl 2-(2-((phenoxycarbonyl)thio)phenyl)acetate, ethyl 2-(2-((phenoxycarbonyl)thio)phenyl)propanoate, ethyl 2-(2-((propoxycarbonyl)thio)phenyl)acetate, ethyl 2-(2-((pyrrolidine-1-carbonyl)thio)phenyl)acetate, ethyl 2-(5-(tert-butyl)-2-((diethylcarbamoyl)thio)-3-methyl phenyl)acetate, ethyl 2-(5-(tert-butyl)-2-((ethoxycarbonyl)thio)-3-methyl phenyl)acetate, ethyl 3-methyl-2-(2-((phenoxycarbonyl)thio)phenyl)butanoate, butyl 2-(benzoylthio)benzoate, ethyl 2-((2,2-dimethylpropanethioyl)thio)benzoate, ethyl 2-((2,4,6-trimethylbenzoyl)thio)benzoate, ethyl 2-((2-methylpropanethioyl)thio)benzoate, ethyl 2-((2-naphthoyl)thio)benzoate, ethyl 2-((2-phenyl acetyl)thio)benzoate, ethyl 2-((3-chlorobenzoyl)thio)-3,5-diisopropylbenzoate, ethyl 2-((3-chlorobenzoyl)thio)benzoate, ethyl 2-((4-butylbenzoyl)thio)benzoate, ethyl 2-((4-chlorobenzoyl)thio)-3,5-diisopropylbenzoate, ethyl 2-((4-chlorobenzoyl)thio)benzoate, ethyl 2-((4-chlorophenyl carbonothioyl)thio)benzoate, ethyl 2-((4-propylbenzoyl)thio)benzoate, ethyl 2-(benzoylthio)-3,5-diisopropylbenzoate, ethyl 2-(benzoylthio)-5-(tert-butyl)-3-methylbenzoate, ethyl 2-(benzoylthio)-5-(tert-butyl)benzoate, ethyl 2-(benzoylthio)benzoate, ethyl 2-(ethanethioylthio)benzoate, ethyl 2-(isobutyrylthio)benzoate, ethyl 2-(pivaloylthio)benzoate, ethyl 2-(propionylthio)benzoate, ethyl 3,5-diisopropyl-2-(4-propylbenzoyl)thio)benzoate, ethyl 3,5-diisopropyl-2-((phenylcarbonothioyl)thio)benzoate, ethyl 5-(tert-butyl)-2-((3-chlorobenzoyl)thio)-3-methylbenzoate, ethyl 5-(tert-butyl)-2-((3-chlorobenzoyl)thio)benzoate, ethyl 5-(tert-butyl)-2-((4-chlorobenzoyl)thio)benzoate, ethyl 5-(tert-butyl)-2-((4-propylbenzoyl)thio)benzoate, ethyl 5-(tert-butyl)-2-(2-(4-chlorophenyl)-2-oxoethyl)-3-methylbenzoate, ethyl 5-(tert-butyl)-3-methyl-2-((4-propylbenzoyl)thio)benzoate, propyl 2-((4-chlorobenzoyl)thio)benzoate, butyl 2-((diethylcarbamoyl)thio)benzoate, ethyl 2-((diethylcarbamothioyl)thio) benzoate, ethyl 2-((diethylcarbamoyl)thio)-3,5-diisopropylbenzoate, ethyl 2-((diethylcarbamoyl)thio)-3,5-dimethylbenzoate, ethyl 2-((diethylcarbamoyl)thio)-3-methylbenzoate, ethyl 2-((diethylcarbamoyl)thio)-5-methylbenzoate, ethyl 2-((diethylcarbamoyl)thio)benzoate, ethyl 2-((dimethylcarbamoyl)thio)benzoate, ethyl 2-((di propyl carbamoyl)thio)benzoate, ethyl 2-((ethoxycarbonyl) thio)-3,5-diisopropylbenzoate, ethyl 2-((ethoxycarbonyl) thio)benzoate, ethyl 2-((methoxycarbonyl)thio)benzoate, ethyl 2-((piperidine-1-carbonyl)thio)benzoate, ethyl 2-((propoxycarbonyl)thio)benzoate, ethyl 2-((pyrrolidine-1-carbonothioyl)thio)benzoate, ethyl 2-((pyrrolidine-1-carbonyl)thio)benzoate, ethyl 2-(carbamoylthio)benzoate, ethyl 5-(tert-butyl)-2-((diethylcarbamothioyl)thio)-3-m ethylbenzoate, ethyl 5-(tert-butyl)-2-((diethylcarbamoyl)thio)-3-methylbenzoate, ethyl 5-(tert-butyl)-2-((ethoxycarbonothioyl)thio)-3-methylbenzoate, ethyl 5-(tert-butyl)-2-((ethoxycarbonyl)thio)-3-methylbenzoate, propyl 2-((diethylcarbamoyl)thio)benzoate, ethyl 2-((ethoxycarbonothioyl)thio)acetate, ethyl 3-((ethoxycarbonyl)thio)butanoate, methyl 3-((diethylcarbamoyl)thio)propanoate, ethyl 3-((diethylcarbamoyl)thio)butanoate, ethyl 3-((ethoxycarbonothioyl)thio)propanoate, ethyl 2-((ethoxycarbonyl)thio) benzoate, ethyl 3-(acetylthio)-4-methylpentanoate, ethyl 3-((3-chlorobenzoyl)thio)hexanoate, ethyl 3-((3-chlorobenzoyl)thio)octanoate, ethyl 3-((ethoxycarbonyl)thio)hexanoate, ethyl 3-((ethoxycarbonyl)thio)-4-methyl pentanoate, ethyl 3-((ethoxycarbonyl)thio)octanoate, ethyl 3-((ethoxycarbonyl)thio)-3-phenyl propanoate, ethyl 3-(4-(tert-butyl) phenyl)-3-((ethoxycarbonyl)thio)propanoate, ethyl 3-(2,5-dimethyl phenyl)-3-((ethoxycarbonyl)thio)propanoate, ethyl 3-((diethylcarbamoyl)thio)hexanoate, ethyl 3-((diethylcarbamoyl)thio)-5-methyl hexanoate, and ethyl 3-((diethylcarbamoyl)thio)octanoate.

The electron donors disclosed in the present application can be prepared from commercially available mercapto-ester precursors which can be reacted with the proper reactants and reagents to form the Y derivative. In case the mercapto-ester precursor is not available, the electron donor(s) can be prepared following the synthetic approach described in U.S. Pat. App. Pub. No. 2011/0282089, which is incorporated by reference.

In some embodiments, the final amount of electron donor compound in the solid catalyst component ranges from 1 to 25% by weight, such as from 3 to 20% by weight.

As explained above, the catalyst components comprise, in addition to the above described electron donors, Ti, Mg and halogen(s). In some embodiments, the catalyst components comprise a titanium compound having at least one Ti-halogen bond, and the disclosed electron donor compounds are supported on a Mg-halide solid component. The magnesium halide is, in some embodiments, $MgCl_2$ in active form as disclosed in the patent literature describing supports for Ziegler-Natta catalysts. For instance, U.S. Pat. Nos. 4,298,718 and 4,495,338 were the first to describe the use of these compounds in Ziegler-Natta catalysis, which further describe magnesium dihalides in active form and used as a support or co-support in components of catalysts for the polymerization of olefins. These compounds may be characterized by X-ray spectra in which the most intense diffraction line that appears in the spectrum of the non-active halide is diminished in intensity and is replaced by a halo whose maximum intensity is displaced towards lower angles relative to that of the more intense line.

In certain embodiments, titanium compounds used in the catalyst component of the present disclosure are $TiCl_4$ and $TiCl_3$. Ti-haloalcoholates of the formula $Ti(OR)_{m-y}X_y$ can also be used, where m is the valence of titanium, y is a number between 1 and m−1, X is halogen and R is a hydrocarbon radical having from 1 to 10 carbon atoms.

In one embodiment, the amount of Ti atoms is higher than 2.5% wt, including higher than 3.0% and in the range 3.0 to 8% with respect to the total weight of the catalyst component.

The preparation of the solid catalyst component can be carried out according to several methods. One method comprises the reaction between magnesium alcoholates or chloroalcoholates (including chloroalcoholates prepared according to U.S. Pat. No. 4,220,554) and an excess of $TiCl_4$ in the presence of the electron donor compounds at a temperature of about 80° C. to 120° C.

According to one method for use in the present disclosure, the solid catalyst component can be prepared by reacting a titanium compound of the general formula $Ti(OR)_{m-y}X_y$, where m is the valence of titanium and y is a number between 1 and m, including $TiCl_4$, with a magnesium chloride derived from an adduct of the formula $MgCl_2$.pROH, where p is a number between 0.1 and 6, including from 2 to 3.5, and R is a hydrocarbon radical having 1-18 carbon atoms. The adduct can be prepared in spherical form by mixing alcohol and magnesium chloride in the presence of an inert hydrocarbon immiscible with the adduct under stirring conditions at the melting temperature of the adduct (about 100-130° C.). The emulsion is quickly quenched, thereby causing the solidification of the adduct in form of spherical particles. Examples of spherical adducts prepared according to this procedure are described in U.S. Pat. Nos. 4,399,054 and 4,469,648. The resulting adduct can be directly reacted with a Ti compound or subjected to thermal controlled dealcoholation (at a temperature of about 80-130° C.) so as to obtain an adduct in which the number of moles of alcohol is generally lower than 3, including 0.1 to 2.5. The reaction with the Ti compound can be carried out by suspending the adduct (optionally dealcoholated) in cold $TiCl_4$ (generally at a temperature of about 0° C.). The mixture is heated to 80-130° C. and kept at this temperature for 0.5-2 hours. The treatment with $TiCl_4$ can be carried out one or more times. The mercapto-derivative electron donor compound may be added during the treatment with $TiCl_4$. The preparation of catalyst components in spherical form are described, for example, in European Patent Applications EP-A-395083, EP-A-553805, EP-A-553806, and EPA601525, and WIPO Pat. App. Pub. No. WO98/44001.

The solid catalyst components obtained according to the above method show a surface area (as determined by the B.E.T. method) between 20 and 500 $m^2/g$, including between 50 and 400 $m^2/g$, and a total porosity (as determined by the B.E.T. method) higher than 0.2 $cm^3/g$, such as between 0.2 and 0.6 $cm^3/g$. The porosity (Hg method) due to pores with radii up to 10.000 Å can range from 0.3 to 1.5 $cm^3/g$, including from 0.45 to 1 $cm^3/g$. The solid catalyst component has, in certain embodiments, an average particle size ranging from 5 to 120 μm, such as from 10 to 100 μm.

In any of these preparation methods, the electron donor compounds can be added as such or, in an alternative way, it can be obtained in situ by using an appropriate precursor capable of being incorporated as an electron donor compound by means, for example, of suitable chemical reactions.

Regardless of the preparation method used, the final amount of the electron donor compound of formula (I) is such that its molar ratio with respect to the Ti atoms is from 0.01 to 2, including from 0.05 to 1.2.

In some embodiments, the solid catalyst components according to the present disclosure are converted into catalysts for the polymerization of olefins by reacting them with organoaluminum compounds according to known methods.

In certain embodiments, a catalyst for the polymerization of olefins of the formula $CH_2{=}CHR$, in which R is hydrogen or a hydrocarbyl radical with 1-12 carbon atoms, is produced and comprises the product obtained by contacting:

(i) a solid catalyst component as disclosed herein;

(ii) an alkylaluminum compound; and optionally (iii) an external electron donor compound.

In some embodiments, the alkyl-Al compound (ii) is chosen from among the trialkyl aluminum compounds such as triethylaluminum, triisobutylaluminum, tri-n-butylaluminum, tri-n-hexylaluminum, tri-n-octylaluminum. It is also possible to use alkylaluminum halides, alkylaluminum hydrides and alkylaluminum sesquichlorides, such as $AlEt_2Cl$ and $Al_2Et_3Cl_3$, possibly in mixture with the above described trialkylaluminums.

External electron-donor compounds for use in the present disclosure include silicon compounds, ethers, esters, amines, heterocyclic compounds, 2,2,6,6-tetramethylpiperidine and ketones.

Another class of external donor compounds for use in the present disclosure is silicon compounds of the formula $(R_7)_a(R_8)_bSi(OR_9)_c$, where a and b are integers from 0 to 2, c is an integer from 1 to 4 and the sum (a+b+c) is 4; and $R_7$, $R_8$, and $R_9$, are radicals with 1-18 carbon atoms, optionally containing heteroatoms. In some embodiments, silicon compounds in which a is 1, b is 1, c is 2, at least one of $R_7$ and $R_8$ is selected from branched alkyl, cycloalkyl or aryl groups with 3-10 carbon atoms optionally containing heteroatoms and $R_9$ is a $C_1$-$C_{10}$ alkyl group, including methyl groups, may be used. Examples of such silicon compounds are methylcyclohexyldimethoxysilane (C donor), diphenyldimethoxysilane, methyl-t-butyldimethoxysilane, dicyclopentyldimethoxysilane (D donor), diisopropyl dim ethoxysilane, (2-ethylpiperidinyl)t-butyldimethoxysilane, (2-ethylpiperidinyl)thexyldimethoxysilane, (3,3,3-tri fluoro-n-propyl)(2-ethylpiperidinyl)dimethoxysilane, methyl(3,3,3-trifluoro-n-propyl)dimethoxysilane, and N,N-diethylaminotriethoxysilane. Moreover, silicon compounds in which a is 0, c is 3, $R_8$ is a branched alkyl or cycloalkyl group, optionally containing heteroatoms, and $R_9$ is a methyl group may be used. Examples of these silicon compounds are cyclohexyltrimethoxysilane, t-butyltrimethoxysilane and thexyltrimethoxysilane.

In certain embodiments, the electron donor compound (iii) is used in such an amount as to give a molar ratio between the organoaluminum compound and the electron donor compound (iii) of from 0.1 to 500, including from 1 to 300 and from 3 to 100.

A further embodiment relates to a process for the (co) polymerization of olefins $CH_2{=}CHR$, in which R is hydrogen or a hydrocarbyl radical with 1-12 carbon atoms, carried out in the presence of a catalyst comprising the product of the reaction between:

(i) the solid catalyst component comprising Mg, Ti and an electron donor compound of formula (I);

(ii) an alkylaluminum compound; and (iii) optionally an electron-donor compound (external donor).

The polymerization process can be carried out according to available techniques known to the skilled artisan, for example slurry polymerization using as an inert hydrocarbon solvent as a diluent, or bulk polymerization using a liquid monomer (for example, propylene) as a reaction medium. Moreover, it is possible to carry out the polymerization process in gas-phase operating in one or more fluidized or mechanically agitated bed reactors.

In some embodiments, the polymerization temperature can range from 20 to 120° C., such as from 40 to 80° C. When the polymerization is carried out in gas-phase, the operating pressure may range between 0.5 and 5 MPa, such as between 1 and 4 MPa. In bulk polymerization processes, the operating pressure may range between 1 and 8 MPa, including between 1.5 and 5 MPa.

In the polymerization of propylene using the catalyst of the present disclosure and under the standard polymerization conditions described in the experimental section, it is possible to obtain polymerization activities ranging from 25 to 50 kg/g of catalyst combined with high polymer isotacticity, expressed by a value of xylene insoluble matter, of higher than 97.5%, including higher than 98% wt.

The following examples are given in order to further illustrate embodiments of the disclosed subject matter without limiting it.

EXAMPLES

Determination of Xylene Insolubility (X.I.)

2.5 g of polymer and 250 ml of o-xylene were placed in a round-bottomed flask equipped with a cooler and a reflux condenser and kept under nitrogen. The resulting mixture was heated to 135° C. and stirred for about 60 minutes. The final solution was allowed to cool to 25° C. under continuous stirring, and the insoluble polymer was filtered. The filtrate was then evaporated in a nitrogen flow at 140° C. to reach a constant weight. The content of the xylene-soluble fraction is expressed as a percentage of the original 2.5 grams and then, by difference, the X.I. %.

Determination of Donors

The content of electron donor was determined via gas chromatography. The solid component was dissolved in acidic water and extracted with ethyl acetate, an internal standard was added, and a sample of the organic phase was analyzed in a gas chromatograph to determine the amount of electron donor present in the starting catalyst compound.

Melt Flow Rate (MFR or MIL)

The melt flow rate (MIL) of the polymer was determined according to ISO 1133 (230° C., 2.16 kg).

Electron Donor Synthesis

The electron donors in the Examples 1-5, 7, 10-13, and 16-17 have been prepared from commercially available mercapto-ester precursors. The electron donors in the other examples have been prepared according to the synthetic approach described in U.S. Pat. App. Pub. No. 2011/0282089 and illustrated below:

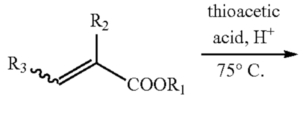

-continued

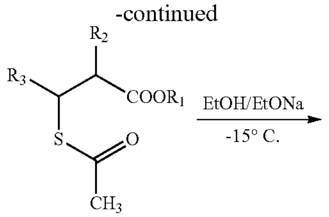

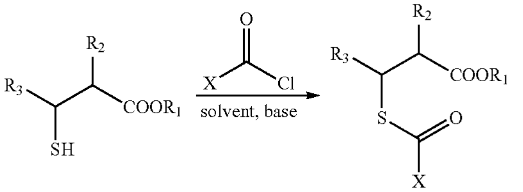

General Procedure for the Preparation of the Solid Catalyst Component

The catalyst components have been prepared according to the following procedure:

250 ml of $TiCl_4$ were introduced into a 500 ml round bottom flask, equipped with mechanical stirrer, cooler and thermometer, at room temperature under a nitrogen atmosphere. After cooling to 0° C. and while stirring, the internal electron donor and 10.0 g of the spherical adduct (prepared as described above) were sequentially added into the flask. The amount of charged internal donor was such as to produce a Mg/donor molar ratio of 6. The temperature was raised to 100° C. and maintained for 2 hours. Thereafter, stirring was stopped, the solid product was allowed to settle and the supernatant liquid was siphoned off at 100° C. After the supernatant was removed, additional $TiCl_4$ was added to reach the initial liquid volume (250 ml) again. The mixture was then heated at 120° C. and kept at this temperature for 1 hour. Stirring was stopped again, the solid was allowed to settle and the supernatant liquid was siphoned off.

The solid was washed with anhydrous hexane six times (6×100 mL) in a temperature gradient down to 60° C. and one time (100 ml) at room temperature. The resulting solid was then dried under vacuum and analyzed.

General Procedure for the Polymerization of Propylene

All the solid catalyst components have been tested according to the following procedure. A 4 liter steel autoclave equipped with a stirrer, pressure gauge, thermometer, catalyst feeding system, monomer feeding lines and thermostatic jacket, was purged with nitrogen flow at 70° C. for one hour. Then, at 30° C. under propylene flow, were charged in sequence with 75 ml of anhydrous hexane, 0.76 g of $AlEt_3$, 0.076 g of dicyclopentyldimethoxysilane (D donor) and 0.006-0.010 g of solid catalyst component. The autoclave was closed, and 2.0 N of hydrogen was added. Then, under stirring, 1.2 kg of liquid propylene was fed into the reaction mixture. The temperature was raised to 70° C. in five minutes and the polymerization was carried out at this temperature for two hours. At the end of the polymerization, the non-reacted propylene was removed; the polymer was recovered and dried at 70° C. under vacuum for three hours. Then the polymer was weighed and fractionated with o-xylene to determine the amount of the xylene insoluble (X.I.) fraction.

TABLE 1

Composition and performance of exemplified catalysts

| | Catalyst composition | | | Polymerization | | |
|---|---|---|---|---|---|---|
| | Internal Donor | | Ti | Mileage | XI | MIL |
| Ex. | Structure/Name | % wt | % wt | kg/g | % wt | g/10' |
| 1 | 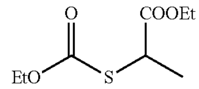 ethyl 2-((ethoxycarbonyl) thio)propanoate | 10.1 | 2.9 | 32 | 96.9 | 8.1 |
| 2 | 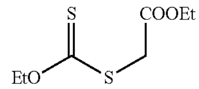 ethyl 2-((ethoxy-carbonothioyl)thio) acetate | 5.0 | 4.0 | 32 | 95.2 | 6.6 |
| 3 | 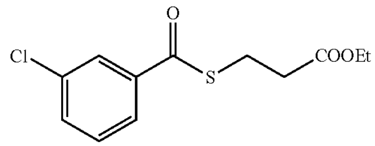 ethyl 3-((3-chlorobenzoyl)thio)propanoate | 10.7 | 2.8 | 21 | 96.3 | 5.3 |

TABLE 1-continued

Composition and performance of exemplified catalysts

| Ex. | Catalyst composition: Internal Donor Structure/Name | Internal Donor % wt | Ti % wt | Polymerization: Mileage kg/g | XI % wt | MIL g/10' |
|---|---|---|---|---|---|---|
| 4 | 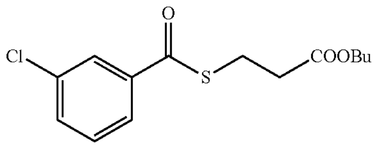 butyl 3-((3-chlorobenzoyl)thio)propanoate | 15.0 | 2.6 | 18 | 98.3 | 5.5 |
| 5 | 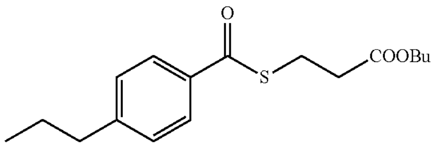 butyl 3-((4-propylbenzoyl)thio)propanoate | 15.4 | 2.9 | 18 | 96.3 | 9.9 |
| 6 | 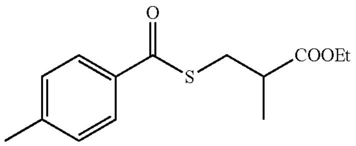 ethyl 2-methyl-3-((4-methylbenzoyl)thio) propanoate | 13.3 | 3.2 | 24 | 96.0 | 8.3 |
| 7 | 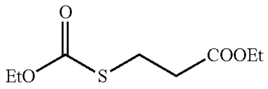 ethyl 3-((ethoxycarbonyl)thio) propanoate | 8.4 | 2.4 | 22 | 98.4 | 4.5 |
| 8 | 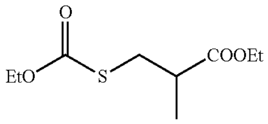 ethyl 3-((ethoxycarbonyl)thio)-2-methylpropanoate | 10.2 | 2.4 | 29 | 97.3 | 3.7 |
| 9 | 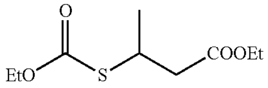 ethyl 3-((ethoxycarbonyl)thio) butanoate | 12.0 | 2.3 | 34 | 98.3 | 3.6 |
| 10 | 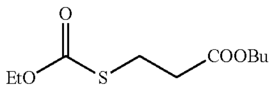 butyl 3-((ethoxycarbonyl)thio) propanoate | 8.7 | 2.2 | 27 | 98.3 | 4.7 |
| 11 | 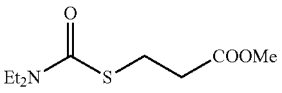 methyl 3-(diethylcarbamoyl)thio) propanoate | 4.9 | 3.3 | 19 | 97.0 | 3.1 |

TABLE 1-continued

Composition and performance of exemplified catalysts

| | Catalyst composition | | | Polymerization | | |
|---|---|---|---|---|---|---|
| | Internal Donor | | Ti | Mileage | XI | MIL |
| Ex. | Structure/Name | % wt | % wt | kg/g | % wt | g/10' |
| 12 | 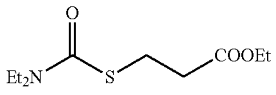 ethyl 3-((diethlcarbamoyl)thio) propanoate | 11.7 | 2.6 | 27 | 97.5 | 3.7 |
| 13 | 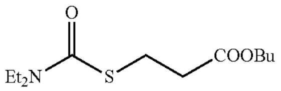 butyl 3-((diethylcarbamoyl)thio) propanoate | 9.7 | 2.8 | 27 | 97.0 | 3.5 |
| 14 | 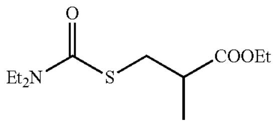 ethyl 3-((diethylcarbamoyl)thio)-2-methylpropanoate | 9.9 | 2.4 | 29 | 96.6 | 3.1 |
| 15 | 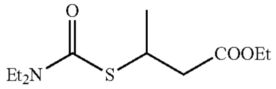 ethyl 3-((diethylcarbamoyl)thio) butanoate | 13.0 | 2.5 | 41 | 97.2 | 2.8 |
| 16 | 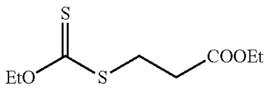 ethyl 3-((ethoxycarbonothioyl) thio)propanoate | n.d. | 3.1 | 22 | 96.6 | 6.2 |
| 17 | 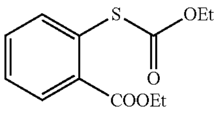 ethyl 2-((ethoxycarbonyl) thio)benzoate | 9.7 | 3.6 | 29 | 94.2 | 7.5 |
| 18 | 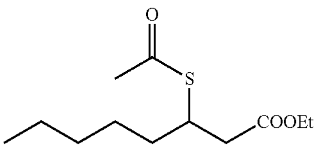 ethyl 3-(acetylthio)octanoate | n.d. | 3.2 | 34 | 95.9 | 9.3 |
| 19 | 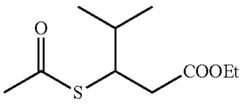 ethyl 3-(acetylthio)-4-methylpentanoate | n.d. | 3.4 | 28 | 95.8 | 10.5 |

TABLE 1-continued

Composition and performance of exemplified catalysts

| | Catalyst composition | | | Polymerization | | |
|---|---|---|---|---|---|---|
| | Internal Donor | | Ti | Mileage | XI | MIL |
| Ex. | Structure/Name | % wt | % wt | kg/g | % wt | g/10' |
| 20 | 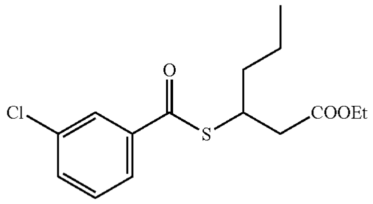 ethyl 3-((3-chlorobenzoyl)thio)hexanoate | 18.0 | 2.6 | 42 | 97.8 | 4.8 |
| 21 | 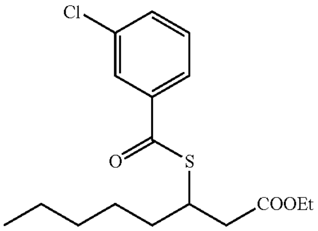 ethyl 3-((3-chlorobenzoyl)thio)octanoate | 20.6 | 2.7 | 50 | 97.7 | 4.7 |
| 22 | 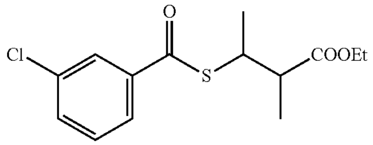 ethyl 3-((3-chlorobenzoyl)thio)-2-methylbutanoate | 16.1 | 2.9 | 36 | 97.1 | 4.3 |
| 23 | 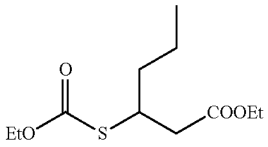 ethyl 3-((ethoxycarbonyl)thio) hexanoate | 18.1 | 2.4 | 41 | 98.6 | 2.3 |
| 24 | 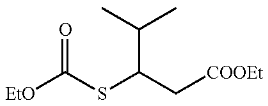 ethyl 3-((ethoxycarbonyl)thio)-4-methylpentanoate | 15.6 | 2.8 | 24 | 98.1 | 4.4 |
| 25 | 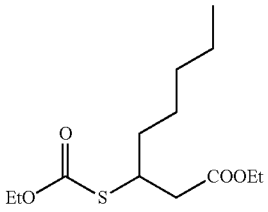 ethyl 3-((ethoxycarbonyl)thio) octanoate | 16.2 | 3.0 | 54 | 98.7 | 4.7 |

TABLE 1-continued

Composition and performance of exemplified catalysts

| | Catalyst composition | | | Polymerization | | |
|---|---|---|---|---|---|---|
| | Internal Donor | | Ti | Mileage | XI | MIL |
| Ex. | Structure/Name | % wt | % wt | kg/g | % wt | g/10' |
| 26 | 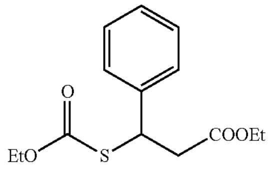 ethyl 3-((ethoxycarbonyl)thio)-3-phenylpropanoate | 16.4 | 2.8 | 35 | 98.1 | 5.1 |
| 27 | 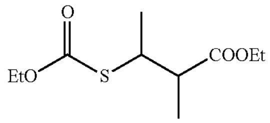 ethyl 3-((ethoxycarbonyl)thio)-2-methylbutanoate | 14.0 | 2.9 | 44 | 98.3 | 4.0 |
| 28 | 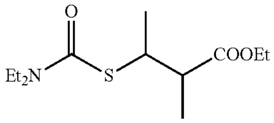 ethyl 3-((diethylcarbamoyl)thio)-2-methylbutanoate | 12.1 | 2.7 | 47 | 97.6 | 4.6 |
| 29 | 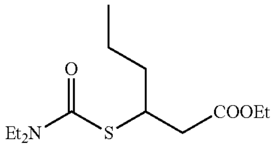 ethyl 3-((diethylcarbamoyl)thio) hexanoate | 12.5 | 2.7 | 58 | 98.2 | 1.9 |
| 30 | 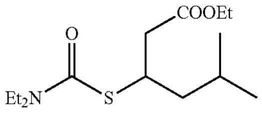 ethyl 3-((diethylcarbamoyl)thio)-5-methylhexanoate | 13.1 | 3.3 | 50 | 97.0 | 5.0 |
| 31 | 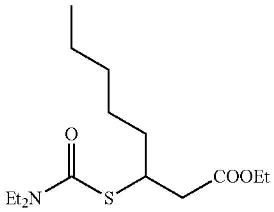 ethyl 3-((diethylcarbamoyl)thio) octanoate | 13.6 | 3.2 | 62 | 97.7 | 4.0 |

What is claimed is:

1. A solid catalyst component for the polymerization of olefins comprising Mg, Ti, Cl and at least one electron donor compound of the formula (I):

(I)

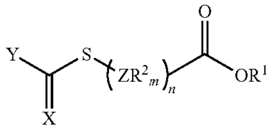

wherein Z is selected from C, Si, O, N, S or P, with the proviso that the atoms O, S, P and N are not directly linked to either the carboxylic group or the sulfur atom of formula (I): the $R^2$ groups, equal to or different from each other, are selected from hydrogen and $C_1$-$C_{20}$ hydrocarbon radicals, optionally containing a heteroatom selected from halogen, P, S, N, O and Si, which are optionally fused together to form one or more cycles; m is a number satisfying the valences of Z; and n is an integer ranging from 1 to 10, X is O or S, Y is —$OR^3$, —$NR^4R^5$ or $R^6$ group in which $R^1$ and $R^3$ are selected from $C_1$-$C_{15}$ hydrocarbon groups optionally containing a heteroatom selected from halogen, P, S, N, O, and Si; and $R^4$-$R^5$ groups, independently, are selected from hydrogen and $R^1$ group, and $R^6$ group have the same composition as $R^1$ group.

2. The catalyst component of claim 1, wherein Z is selected from C or Si.

3. The catalyst of claim 2, wherein —$(ZR^2_m)_n$— is selected from the group consisting of aliphatic, alicyclic and aromatic bivalent radicals, optionally substituted with $C_1$-$C_{15}$ hydrocarbon groups, and optionally containing heteroatoms selected from halogen, P, S, N, O and Si, and n is from 1 to 6 atoms.

4. The catalyst component of claim 3, wherein the electron donor compound comprises the formula (II):

(II)

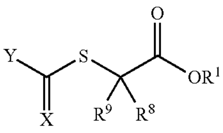

wherein X, Y and $R^1$ have the same composition defined in claim 1, and $R^8$-$R^9$ groups are independently hydrogen or $C_1$-$C_{20}$ hydrocarbon radicals, optionally substituted with heteroatoms selected from halogen, P, S, N, O and Si, which are optionally fused together to form one or more cycles.

5. The catalyst of claim 4, wherein X is O or S, and Y is an $OR^3$ group.

6. The catalyst of claim 5, wherein at least one of $R^8$-$R^9$ groups is different from hydrogen and selected from $C_1$-$C_{10}$ alkyl groups.

7. The catalyst component of claim 3, wherein the electron donor compound comprises the formula (III):

(III)

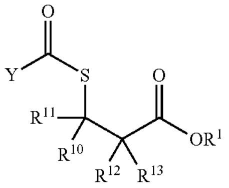

wherein Y and $R^1$ have the same composition defined in claim 1, and $R^{10}$-$R^{13}$ groups are independently hydrogen or $C_1$-$C_{20}$ hydrocarbon radicals, optionally containing heteroatoms selected from halogen, P, S, N, O and Si, and are optionally fused together to form one or more cycles.

8. The solid catalyst component of claim 7, wherein Y is an —$OR^3$ group in which $R^3$ is a $C_1$-$C_{10}$ alkyl group.

9. The solid catalyst component of claim 7, wherein Y is —$NR^4R^5$, $R^{10}$ to $R^{13}$groups are independently hydrogen or a $C_1$-$C_5$ alkyl radicals, and $R^1$ is a $C_1$-$C_5$ linear alkyl group.

10. The solid catalyst component of claim 7, wherein $R^6$ is selected from phenyl rings monosubstituted with a substituent belonging to hydrocarbon groups or halogen.

11. The solid catalyst component of claim 7, wherein at least one of $R^{10}$-$R^{11}$ groups comprises a $C_1$-$C_{20}$ hydrocarbon radical.

12. The catalyst component of claim 3, wherein the electron donor compound comprises the formula (IV):

(IV)

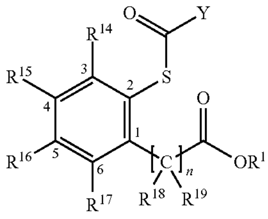

wherein Y and $R^1$ have the same composition defined in claim 1; $R^{18}$ to $R^{19}$ groups, which are the same or different from each other, are selected from hydrogen or $C_1$-$C_{15}$ hydrocarbon groups, optionally containing a heteroatom selected from halogen, P, S, N, O, and Si and are optionally fused together to form one or more cycles, n is an integer from 0 to 2 and $R^{14}$-$R^{17}$, independently, are selected from hydrogen, halogens or $C_1$-$C_{15}$ hydrocarbon groups optionally containing heteroatoms selected from halogen, P, S, N, O or Si.

13. The catalyst component of claim 12, wherein n is 0, Y is an —$OR^3$ group in which $R^3$ is a $C_1$-$C_{10}$ alkyl group, $R^1$ is a $C_1$-$C_{10}$ alkyl group and $R^{14}$-$R^{17}$ are hydrogen.

14. A catalyst for the polymerization of olefins comprising the product of the reaction between:

the solid catalyst component of claim 1;

an alkylaluminum compound; and optionally an external electron donor compound.

15. A process for the (co)polymerization of olefins comprising the formula $CH_2$=CHR', wherein R' is selected from hydrogen or a hydrocarbyl radical with 1-12 carbon atoms, wherein the process is carried out in the presence of a catalyst system comprising the catalyst of claim 14.

* * * * *